United States Patent
Sun et al.

(10) Patent No.: US 11,455,735 B2
(45) Date of Patent: Sep. 27, 2022

(54) TARGET TRACKING METHOD, DEVICE, SYSTEM AND NON-TRANSITORY COMPUTER READABLE STORAGE MEDIUM

(71) Applicant: BOE Technology Group Co., Ltd., Beijing (CN)

(72) Inventors: Yuhai Sun, Beijing (CN); Yu Gu, Beijing (CN); Jiashuang Zong, Beijing (CN)

(73) Assignee: BEIJING BOE TECHNOLOGY DEVELOPMENT CO., LTD., Beijing (CN)

(*) Notice: Subject to any disclaimer, the term of this patent is extended or adjusted under 35 U.S.C. 154(b) by 90 days.

(21) Appl. No.: 16/915,131

(22) Filed: Jun. 29, 2020

(65) Prior Publication Data
US 2021/0065384 A1    Mar. 4, 2021

(30) Foreign Application Priority Data
Aug. 29, 2019   (CN) .......................... 201910805803.7

(51) Int. Cl.
   *G06T 7/246*      (2017.01)
   *G06V 40/20*     (2022.01)
(52) U.S. Cl.
   CPC .............. *G06T 7/248* (2017.01); *G06V 40/23* (2022.01); *G06T 2207/10016* (2013.01); *G06T 2207/30196* (2013.01)
(58) Field of Classification Search
   CPC combination set(s) only.
   See application file for complete search history.

(56) References Cited

U.S. PATENT DOCUMENTS

| 8,229,164 B2 | 7/2012 | Miyamoto et al. |
| 2010/0002908 A1 | 1/2010 | Miyamoto et al. |

(Continued)

FOREIGN PATENT DOCUMENTS

| CN | 107481270 A | 12/2017 |
| CN | 107481284 A | 12/2017 |

(Continued)

OTHER PUBLICATIONS

Similarity measures and distances: Basic reference and examples for data science practitioners, pp. 5, last updated Mar. 10, 2018 (Year: 2018).*

(Continued)

*Primary Examiner* — Vikkram Bali
(74) *Attorney, Agent, or Firm* — Dinsmore & Shohl LLP

(57) ABSTRACT

The present disclosure relates to a target tracking method, device, system, and a non-transitory computer-readable storage medium. The method includes: determining an area where a current target is located by performing target detection on a current frame image; extracting a current position information of the area where the current target is located; predicting a position information of an area where each historical target is located at a corresponding moment of the current frame image based on historical position information of an area where each historical target is located in one or more historical frame images; determining a historical target that is the same target as the current target based on a position difference between the current position information and the predicted position information, and tracking the current target.

17 Claims, 6 Drawing Sheets

(56) References Cited

U.S. PATENT DOCUMENTS

| | | | |
|---|---|---|---|
| 2011/0243381 A1* | 10/2011 | Tsagkatakis | G06K 9/66 382/103 |
| 2018/0137649 A1* | 5/2018 | Schulter | G08B 21/02 |
| 2019/0332935 A1* | 10/2019 | Sanchez Bermudez | G06N 20/10 |

FOREIGN PATENT DOCUMENTS

| | | |
|---|---|---|
| CN | 107563313 A | 1/2018 |
| CN | 108629791 A | 10/2018 |
| CN | 108924507 A | 11/2018 |
| CN | 109509214 A | 3/2019 |
| CN | 109635657 A | 4/2019 |
| CN | 109816690 A | 5/2019 |
| CN | 109903310 A | 6/2019 |
| CN | 110517293 A | 11/2019 |

OTHER PUBLICATIONS

Chinese first office action related to Chinese Application No. 201910805803.7. pp. 1-13.

Chinese Application No. 201910805803.7, Second Office Action dated Mar. 24, 2022.

\* cited by examiner

TARGET TRACKING METHOD, DEVICE, SYSTEM AND NON-TRANSITORY COMPUTER READABLE STORAGE MEDIUM

CROSS-REFERENCE TO RELATED APPLICATIONS

The present application is based on and claims priority to China Patent Application No. 201910805803.7 filed on Aug. 29, 2019, the disclosure of which is incorporated by reference herein in its entirety.

TECHNICAL FIELD

The present disclosure relates to the field of artificial intelligence technology, and in particular, to a target tracking method, a target tracking device, a target tracking system, and a non-transitory computer-readable storage medium.

BACKGROUND

At present, in many areas, there is a need to perform target detection and tracking of the pedestrians within a monitoring range. With the development of artificial intelligence, the processing capability of tracking a trajectory of the pedestrians based on deep learning has been greatly developed.

In the related art, based on the deep learning method, the positions of the same person in multiple frame images are matched, and the matched positions are connected to obtain a trajectory of the person.

SUMMARY

According to some embodiments of the present disclosure, a target tracking method is provided. The method comprises: determining an area where a current target is located, by performing target detection on a current frame image; extracting a current position information of the area where the current target is located; predicting a position information of an area where each historical target is located at a moment of the current frame image, based on historical position information of an area where each historical target is located on one or more historical frame images; and determining a historical target that is the same target as the current target, based on a position difference between the current position information and the predicted position information, and tracking the current target.

In some embodiments, the predicting a position information of an area where each historical target is located at a corresponding moment of the current frame image comprises: predicting the position information of the area where each historical target is located at the corresponding moment of the current frame image, by a non-linear filtering method.

In some embodiments, the predicting the position information of an area where each historical target is located at the corresponding moment of the current frame image comprises: predicting the position information of the area where each historical target is located at the corresponding moment of the current frame image, with center point coordinates, aspect ratio and height of the area where each historical target is located on one or more historical frame images, as well as a rate of change in the center point coordinates, a rate of change in the aspect ratio and a rate of change in the height as inputs of the non-linear filtering method.

In some embodiments, the target tracking method further comprises: extracting a current feature vector of the area where the current target is located on the current frame image; obtaining a historical feature vector of the area where each historical target is located on one or more historical frame images; and determining a feature difference between the current target and the each historical target, based on the current feature vector and each historical feature vector; wherein the determining a historical target that is the same target as the current target comprises: determining the historical target that is the same target as the current target, based on the feature difference and the position difference.

In some embodiments, the determining a feature difference between the current target and the each historical target comprises: determining the feature difference, based on a minimum cosine distance between the current feature vector and the each historical feature vector.

In some embodiments, the position difference is determined based on a Mahalanobis distance between the current position information and the predicted position information.

In some embodiments, the tracking the current target comprises: updating a historical trajectory where the historical target is located, based on the current position information, and forming a tracking trajectory of the current target.

In some embodiments, the forming a tracking trajectory of the current target comprises: converting coordinates of each trajectory point in the historical trajectory updated in an image coordinate system into coordinates in a world coordinate system, and determining the tracking trajectory.

According to other embodiments of the present disclosure, a target tracking device is provided. The target tracking device comprises one or more processors configured to: determine an area where a current target is located, by performing target detection on a current frame image; extract a current position information of the area where the current target is located; predict a position information of an area where each historical target is located at a moment of the current frame image, based on historical position information of an area where each historical target is located on one or more historical frame images; and determine a historical target that is the same target as the current target, based on a position difference between the current position information and the predicted position information, and tracking the current target.

In some embodiments, the predicting a position information of an area where each historical target is located at a corresponding moment of the current frame image comprises: predicting the position information of the area where each historical target is located at the corresponding moment of the current frame image, by a non-linear filtering method.

In some embodiments, the predicting the position information of an area where each historical target is located at the corresponding moment of the current frame image comprises: predicting the position information of the area where each historical target is located at the corresponding moment of the current frame image, with center point coordinates, aspect ratio and height of the area where each historical target is located on one or more historical frame images, as well as a rate of change in the center point coordinates, a rate of change in the aspect ratio and a rate of change in the height as inputs of the non-linear filtering method.

In some embodiments, the processor is further configured to: extract a current feature vector of the area where the current target is located on the current frame image; obtain a historical feature vector of the area where each historical target is located on one or more historical frame images; and determine a feature difference between the current target and the each historical target, based on the current feature vector and each historical feature vector; wherein the determining a historical target that is the same target as the current target comprises: determine the historical target that is the same target as the current target, based on the feature difference and the position difference.

In some embodiments, the tracking the current target comprises: updating a historical trajectory where the historical target is located, based on the current position information, and forming a tracking trajectory of the current target.

In some embodiments, the forming a tracking trajectory of the current target comprises: converting coordinates of each trajectory point in the historical trajectory updated in an image coordinate system into coordinates in a world coordinate system, and determining the tracking trajectory.

According to still other embodiments of the present disclosure, a target tracking device is provided. The target tracking device comprises: a memory; and a processor coupled to the memory, wherein the processor is configured to perform the target tracking method according to any of the above-described embodiments based on instructions stored in the memory device.

According to yet other embodiments of the present disclosure, there is provided a non-transitory computer-readable storage medium on which a computer program is stored, which when executed by a processor implements the target tracking method according to any of the above-described embodiments.

According to some embodiments of the present disclosure, a target tracking system is provided. The target tracking system comprises: the target tracking device according to any of the above-described embodiments.

In some embodiments, the target tracking system further comprises: one or more image sensors for obtaining a frame image containing a target.

In some embodiments, the target tracking system further comprises: a display device for displaying the tracking trajectory under a world coordinate system.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noted that, unless otherwise specified, the relative arrangements of the components and steps expounded in these embodiments should be construed as merely illustrative, rather than as a delimitation.

Unless otherwise defined, all terms (comprising technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

Figure 1:
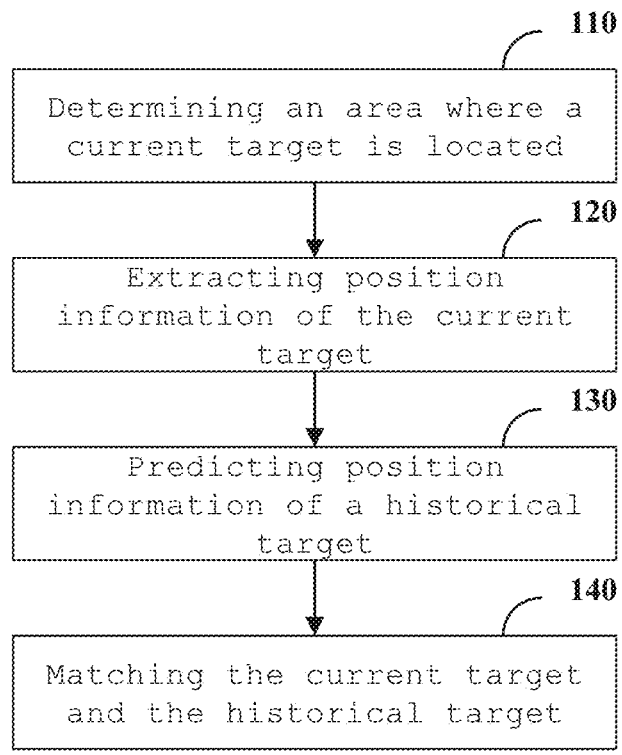
FIG. 1 shows a flowchart of a target tracking method according to one embodiment of the present disclosure.

FIG. 1 shows a flowchart of a target tracking method according to one embodiment of the present disclosure.

As shown in FIG. 1, the method comprises: step 110, determining an area where a current target is located; step 120, extracting position information of the current target; step 130, predicting position information of a historical target; and step 140, matching the current target and the historical target.

In step 110, target detection is performed on a current frame image to determine the area where the current target is located.

In some embodiments, target detection on the current frame image may be performed using a single-stage deep learning detection model with excellent real-time performance and accuracy, such as a convolutional neural network model and YOLO (You Only Look Once) v3 model. For example, the current frame image may be scaled to an image with a size of 416×416 which is then input into the YOLO v3 model. After non-maximum suppression, the predicted probability of the target which is a "person" in the previous frame image and the position of the corresponding box may be obtained.

In step 120, the current position information of the area where the current target is located is extracted. For example, in the case where it is determined that the target is a "person", the position of the corresponding box may serve as the current position information.

In some embodiments, the area where the current target (such as a pedestrian) is located in the frame image may be determined by the target detection method. For example, the area where it is located may be an image within a rectangular box, and the frame image may have a plurality of targets. That is, there are a plurality of boxes. The current position information may be the position information (u, v, γ, h) of the box. u and v are the abscissa and ordinate of a central position of the box, y is the aspect ratio of the box, and h is the height of the box.

In step 130, the position information of the area where each historical target is located at the current frame moment is predicted based on the historical position information of the area where each historical target is located in the historical frame image.

In some embodiments, the position information of the area where each historical target is located at the current frame moment may be predicted by a non-linear filtering method (such as Kalman filter, unscented filter and particle filter). For example, the position information of the area where each historical target is located at the current frame moment may be predicted with the coordinates of the center point, the aspect ratio, and the height of the area where the historical target is located, as well as the rate of change in the coordinates of the center point, the rate of change in the aspect ratio, and the rate of change in the height as inputs of the non-linear filtering method.

In some embodiments, state estimation may be performed on the trajectories of historical targets. For example, it may be determined that the state variables of the historical targets are 8-dimensional vectors(u,v,γ,h,u̇,v̇,γ̇,ḣ), u̇,v̇ and ḣ are rates of change of u,v,γ and h respectively. Estimation may be performed on changes in state variables using a non-linear filter method, thereby predicting the position information of historical targets at the current frame moment.

In some embodiments, the Mahalanobis distance between the position information of the box in the target detection results (detections) of the current frame image and the position information predicted by the Kalman filter may be calculated:

$$d_p = (de-pr)^T S^{-1}(de-pr)$$

de is the position information of a box in the current frame image, pr is the position information predicted by a filter to the target, and S is the covariance matrix between the current position information and the predicted position information.

In step 140, a historical target that is the same target as the current target is determined based on the position difference between the current position information and the predicted position information, so as to track the current target.

In some embodiments, if the distance $d_p$ is greater than a certain threshold, the distance may be set to infinity. That is, the current target is far from the historical target in position, so that they do not match, i.e., they are not the same target; if the distance $d_p$ is less than or equal to a certain threshold, it may be determined that the current target matches the historical target, i.e. they are the same target.

In some embodiments, in a matched case, the historical trajectory where the historical target is located is updated based on the current position information, so as to form the tracking trajectory of the current target.

In some embodiments, in addition to the position difference, the feature difference between the current target and the historical target may also be obtained, and then target matching is performed based on the position difference and the feature difference. For example, it may be realized by the embodiment in FIG. 2.

Figure 2:
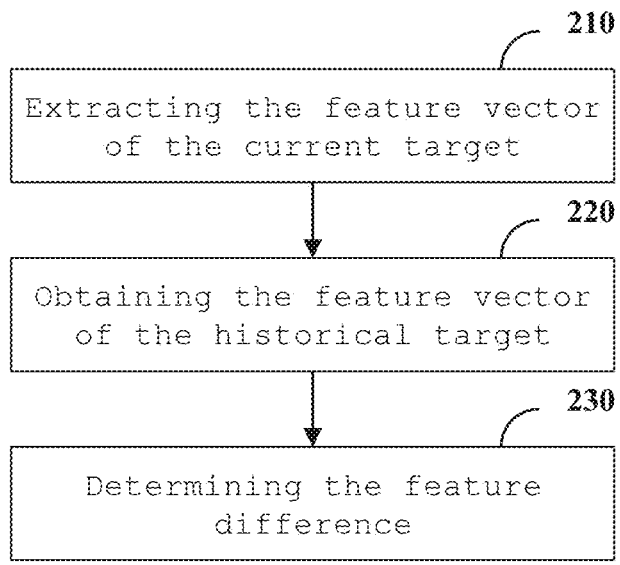
FIG. 2 shows a flowchart of a target tracking method according to another embodiment of the present disclosure.

FIG. 2 shows a flowchart of a target tracking method according to another embodiment of the present disclosure.

As shown in FIG. 2, the method further comprises: step 210, extracting the feature vector of the current target; step 220, obtaining the feature vector of the historical target; and step 230, determining the feature difference.

In step 210, the current feature vector of the area where the current target is located is extracted.

In some embodiments, an image containing only a target (such as a pedestrian) (for example an image within the box that contains the pedestrian in the current frame image) may be input to a machine learning model, and the feature vector of the target (such as 128-dimensional, or the like) may be output as the current feature vector.

In step 220, the historical feature vector of the area where each historical target is located in the historical frame image is obtained. For example, the feature vector of the target in the previous one or more frame images of the current frame image may be obtained as the historical feature vector, and the position information of the target in the previous one or more frame images of the image may be obtained as historical position information.

In step 230, the feature difference between the current target and each historical target is determined based on the current feature vector and each historical feature vector. For example, the feature difference may be determined based on the minimum cosine distance between the current feature vector and each historical feature vector.

In some embodiments, the distance between the feature vector of the pedestrian to be recognized (query) and the feature vector of the image in the pedestrian set (gallery) is measured, so as to determine the similarity of the feature vector, and further determine whether they are the same pedestrian.

For example, the feature vector of the pedestrian to be recognized is $f_1=(x_1, x_2, \ldots, x_n, \ldots, x_N)$, and the feature vector of the images in the pedestrian set is $f_2=(y_1, y_2, \ldots, y_n, \ldots, y_N)$, where N is a positive integer, n is a positive integer less than N. The cosine distance between $f_1$ and $f_2$ may be determined as the feature difference:

$$d_f = \frac{\sum_n x_n y_n}{\sqrt{\sum_n x_n^2} \sqrt{\sum_n y_n^2}}$$

The feature difference may also be determined based on the Euclidean distance of $f_1$ and $f_2$:

$$d'_f = \sqrt{\sum_n (x_n - y_n)^2}$$

In some embodiments, the historical target that is the same target as the current target is determined based on the feature difference and the position difference.

In some embodiments, if the position difference is greater than the threshold, it may be determined that the current target and the historical target are not the same target; if the position difference is less than or equal to the threshold, it may be determined whether the current target and the historical target are the same target based on the feature difference. For example, the feature difference may be determined by any of the above described embodiments. In the case where the feature difference is greater than the feature threshold, the current target and the corresponding historical target are determined to be different targets; in the case where the feature difference is less than or equal to the feature threshold, they are determined to be the same target.

In some embodiments, it is also possible to match the current target with each historical target (to obtain matched indices) using the Hungarian algorithm with the feature difference as a cost function, so as to determine that the current target is the historical target of the same target, thereby tracking the current target. For example, the historical feature vector and historical position information in the tracker is updated using the current feature vector and current position information of the current detection.

In the above-described embodiment, the current target and the historical target are first matched by the position difference, and then the current target and the historical target are matched by the feature difference in the case where the position difference is small. In this way, the problem of misrecognition caused by the occlusion of the target in the frame image (different targets are close in position) may be avoided, thereby improving the accuracy of target tracking.

Figure 3:
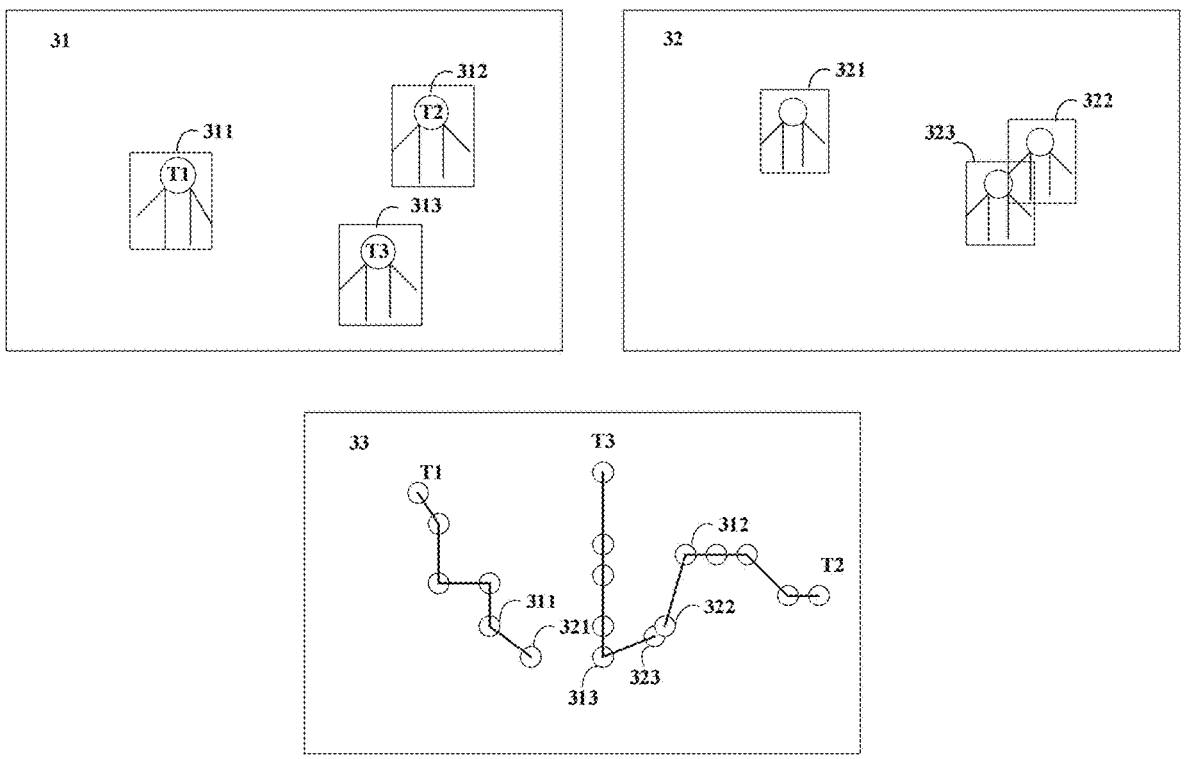
FIG. 3 shows a schematic view of a target tracking method according to one embodiment of the present disclosure.

FIG. 3 shows a schematic view of a target tracking method according to one embodiment of the present disclosure.

As shown in FIG. 3, three boxes: box 321, box 322, and box 323 containing target may be determined by performing target detection on the current frame image 32, and then the position information and feature vectors of the box 321, 322, and 323 may be extracted as the current position information and current feature vector of the corresponding target respectively.

Historical frame images 31 are obtained (which may be plural), wherein there comprise three historical targets with IDs (identifications) T1, T2, and T3 corresponding to box 311, 312, and 313 respectively. The position information and feature vectors of the images within the box 311, 312, and 313 are extracted as the historical position information and historical feature vectors of the corresponding targets respectively.

The position information of the targets: target T1, target T2, and target T3 at the current frame moment may be predicted respectively based on the historical position information of the box 311, 312, and 313. The position difference between the target T1, T2, T3 and the box 321, 322, 323 may be determined based on the predicted position information and the current position information in the current frame image 32 respectively; the feature difference between the target T1, T2, T3 and the box 321, 322, 323 may be determined based on the historical feature vector and the current feature vector in the current frame image 32.

According to the method in any one of the above-described embodiments, the target T1, T2, T3 and the box 321, 322, 323 may be matched based on the position difference and the feature difference. For example, the target in the box 321 and the target T1 may be determined to be the same target; the target in the box 322 and the target T2 may be determined to be the same target; the target in the box 323 and the target T3 may be determined to be the same target. In the case where there is a box in the current frame image 32 that cannot match the historical target in the historical frame image 31, a new ID may be assigned to the target in the box.

In some embodiments, the trajectory where the historical target is located is updated based on the current position information, so as to form the tracking trajectory of the current target. For example, in the trajectory map 33 under the world coordinate system, there are trajectories corresponding to the target T1, the target T2, and the target T3, and the position of the fifth trajectory point in each trajectory is determined based on the box 321, 322, and 323 respectively. Based on the target matching result, the trajectories corresponding to the target T1, the target T2, and the target T3 may be updated according to the box 321, 322, and 323 respectively.

In the above-described embodiment, the accuracy of target tracking may be improved by target matching combined with the position difference and the feature difference. For example, since the positions of the box 323 and 322 in the current frame image 32 are very close, it is likely to cause a false target matching by depending only on the position difference. However, the problem of false matching may be solved by combining the target-specific feature difference.

In some embodiments, the coordinates of each trajectory point in the updated historical trajectory in the image coordinate system are converted into coordinates in the world coordinate system so as to determine the tracking trajectory.

In some embodiments, the coordinates of each trajectory point in the tracking trajectory may be converted to determine the coordinates in the world coordinate system. For example, the coordinates of a plurality of marker points in the image coordinate system may be determined as the first coordinate set in the frame image; the coordinates of these marker points under the world coordinate system may be determined as the second coordinate set, and the coordinate conversion matrix may be determined based on the first coordinate set and the second coordinate set; the coordinates of each trajectory point in the image coordinate system are converted into coordinates in the world coordinate system based on the coordinate conversion matrix.

Figure 4:
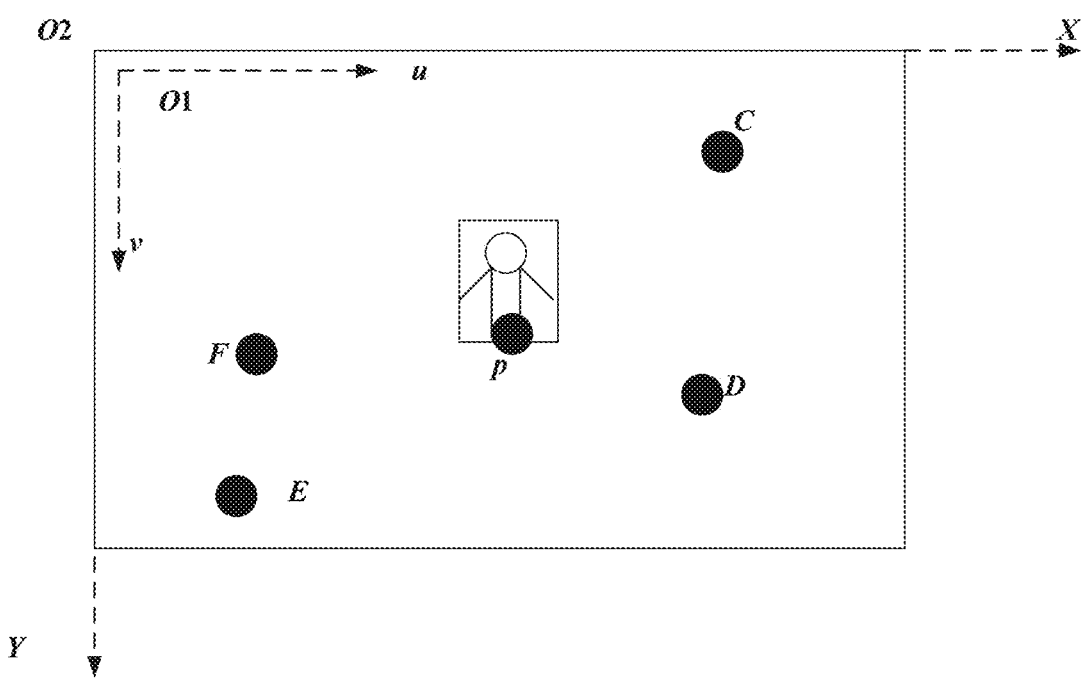
FIG. 4 shows a schematic view of a target tracking method according to another embodiment of the present disclosure.

In some embodiments, coordinate conversion may be achieved by the embodiment in FIG. 4.

FIG. 4 shows a schematic view of a target tracking method according to another embodiment of the present disclosure.

As shown in FIG. 4, the image coordinate system is u-$O_1$-v, and the world coordinate system is X-$O_2$-Y. The coordinates of any four points C, D, E, F in the image (these 4 points may be captured simultaneously in the frame image) in the world coordinate system are ($X_1$, $Y_1$), ($X_2$, $Y_2$), ($X_3$, $Y_3$) and ($X_4$, $Y_4$), and the coordinates in the image coordinate system are ($u_1$, $v_1$), ($u_2$, $v_2$), ($u_3$, $v_3$) and ($u_4$, $v_4$).

According to these four points, the homographic matrix H between the world coordinate system and the image coordinate system may be obtained:

$$\begin{bmatrix} X_q \\ Y_q \\ 1 \end{bmatrix} = H \begin{bmatrix} u_q \\ v_q \\ 1 \end{bmatrix}, q \in [1, 4]$$

After H is obtained, the coordinates P ($u_p$, $v_p$) of the pedestrian's feet obtained by target detection in the image coordinate system may be converted into their positions ($X_p$, $Y_p$) in the world coordinate system using H.

In the above-described embodiment, the method of tracking the multi-target trajectory of the pedestrian captured by multiple cameras may be implemented using a deep learning algorithm. The method may comprise real-time video processing, pedestrian detection, multi-target tracking, and pedestrian re-identification. The real-time video taken by the camera can be processed into the frame image, all pedestrians in the frame image can be identified, and the pedestrians can be boxed. The pedestrians with a plurality of frame images are processed using the trained convolutional neural network; all pedestrian boxes are matched based on the feature vector of each pedestrian frame, such that the trajectories of the pedestrians are tracked. When a pedestrian is blocked or leaves the shooting area and re-enters the shooting area, the pedestrian may be recognized again. At the same time, the pedestrian coordinates are displayed on the 2D map to form a trajectory, so that the trajectory and the video are output synchronously. The drawn trajectory may be played back by time period.

Figure 5:
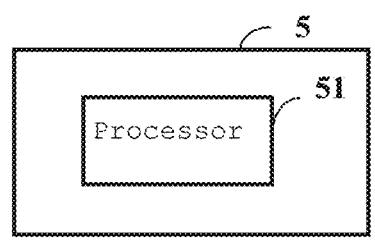
FIG. 5 shows a block view of a target tracking device according to one embodiment of the present disclosure.

FIG. 5 shows a block view of a target tracking device according to one embodiment of the present disclosure.

As shown in FIG. 5, the target tracking device 5 comprises one or more processors 51. The processor 51 is configured to: determine an area where a current target is located, by performing target detection on a current frame image; extract a current position information of the area where the current target is located; predict a position information of an area where each historical target is located at a moment of the current frame image, based on historical position information of an area where each historical target is located on one or more historical frame images; and determine a historical target that is the same target as the current target, based on a position difference between the current position information and the predicted position information, and tracking the current target.

In some embodiments, the position information of the area where each historical target is located at the current frame moment is predicted with the coordinates of the center point, the aspect ratio, and the height of the area where the historical target is located, as well as the rate of change in the coordinates of the central point, the rate of change in the aspect ratio, and the rate of change in the height are used as inputs of the non-linear filtering method.

In some embodiments, the processor 51 is further configured to: extract the current feature vector of the area where the current target is located; obtain the historical feature vector of the area where each historical target is located in the historical frame image; determine the feature difference between the current target and each historical target based on the current feature vector and each historical feature vector.

In some embodiments, the historical target that is the same target as the current target is determined based on the feature difference and the position difference.

In some embodiments, the feature difference is determined based on the minimum cosine distance between the current feature vector and each historical feature vector.

In some embodiments, the position difference is determined based on the Mahalanobis distance between the current position information and the predicted position information.

In some embodiments, the trajectory where the historical target is located is updated based on the current position information, so as to form the tracking trajectory of the current target.

In some embodiments, the coordinates of each trajectory point in the updated historical trajectory in the image coordinate system are converted into coordinates in the world coordinate system so as to determine the tracking trajectory.

Figure 6:
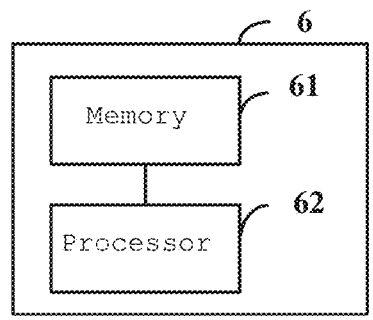
FIG. 6 shows a block view of a target tracking device according to another embodiment of the present disclosure.

FIG. 6 shows a block view of a target tracking device according to another embodiment of the present disclosure.

As shown in FIG. 6, the target tracking device 6 of this embodiment comprises: a memory 61 and a processor 62 coupled to the memory 61. The processor 62 is configured to execute the target tracking method in any embodiment of the present disclosure based on instructions stored in the memory 61.

Wherein, the memory 61 may comprise, for example, a system memory, a fixed non-volatile storage medium, and the like. The system memory stores, for example, an operation system, an application program, a boot loader, a database, and other programs.

Figure 7:
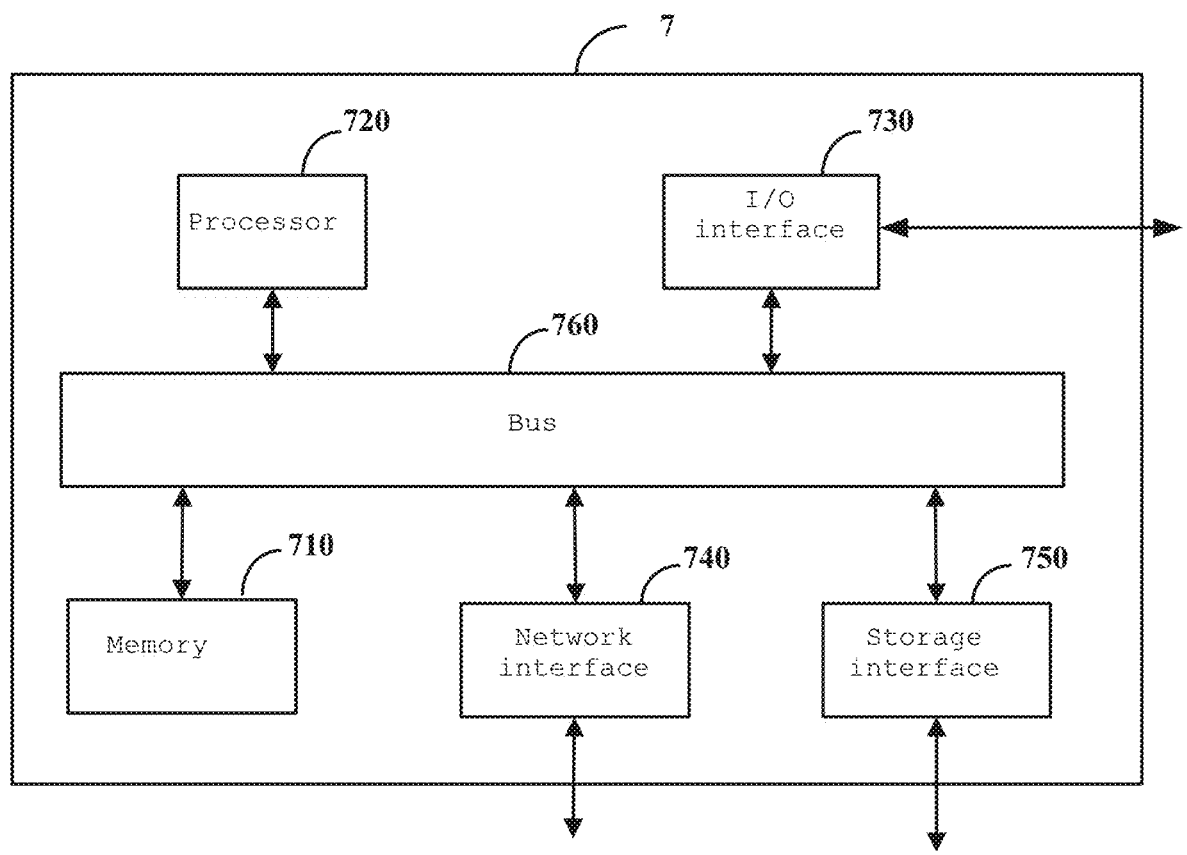
FIG. 7 shows a block view of a target tracking device according to a further embodiment of the present disclosure.

FIG. 7 shows a block view of a target tracking device according to a further embodiment of the present disclosure.

As shown in FIG. 7, the target tracking device 7 of this embodiment comprises: a memory 710 and a processor 720 coupled to the memory 710. The processor 720 is configured to perform the target tracking method in any of the foregoing embodiments based on instructions stored in the memory 610.

The memory 710 may comprise, for example, a system memory, a fixed non-volatile storage medium, and the like. The system memory stores, for example, an operation system, an application program, a boot loader, and other programs.

The target tracking device 7 may further comprise an I/O interface 730, a network interface 740, a storage interface 750, and the like. These interfaces 730, 740, 750 therebetween and the memory 710 and the processor 720 therebetween may be connected via a bus 760, for example. Wherein, the I/O interface 730 provides a connection interface for I/O devices such as a display, a mouse, a keyboard, and a touch screen. The network interface 740 provides a connection interface for various networked devices. The storage interface 750 provides a connection interface for external storage devices such as SD cards and U disks.

Figure 8:
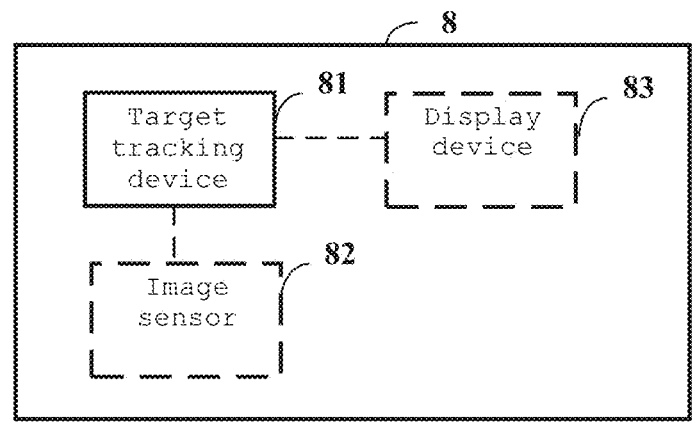
FIG. 8 shows a block view of a target tracking system according to one embodiment of the present disclosure.

FIG. 8 shows a block view of a target tracking system according to one embodiment of the present disclosure.

As shown in FIG. 8, the target tracking system 8 comprises the target tracking device 81 of any of the above-described embodiments.

In some embodiments, the target tracking system 8 further comprises one or more image sensors 82 for obtaining a frame image containing the target.

In some embodiments, the target tracking system 8 further comprises a display device 83 for displaying the tracking trajectory in the world coordinate system.

Figure 9:
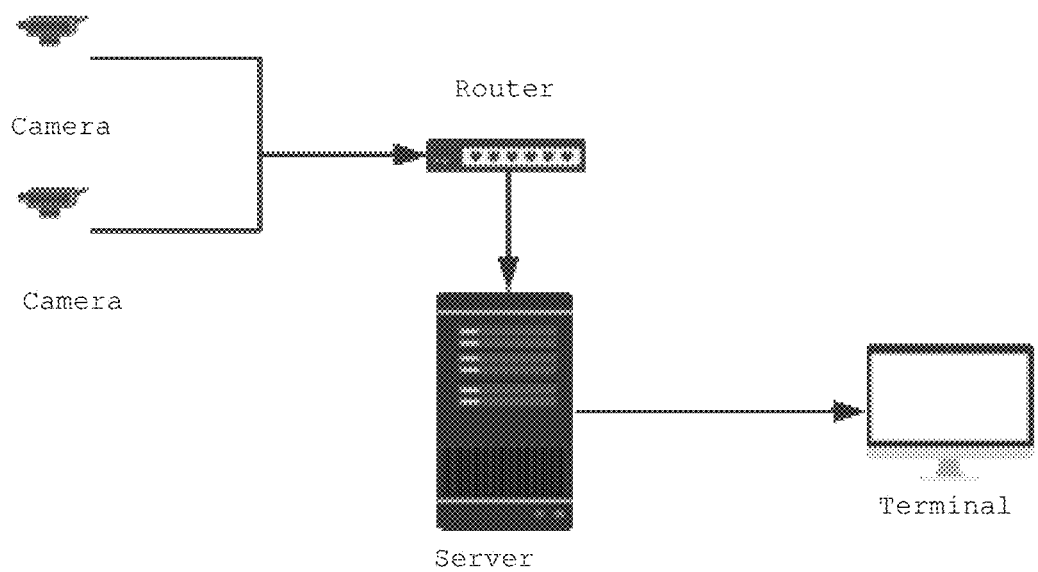
FIG. 9 shows a schematic view of a target tracking system according to one embodiment of the present disclosure.

FIG. 9 shows a schematic view of a target tracking system according to one embodiment of the present disclosure.

As shown in FIG. 9, the camera in the target tracking system may use one or more network cameras. The server may comprise the target tracking device in any one of the foregoing embodiments, and a GPU (Graphics Processing Unit) graphics card may also be installed. The camera sends the collected video stream to the server which then detects, tracks, and re-recognizes the pedestrians in the video stream (that is, performing target matching using the feature difference based on position difference). The server forms a box containing the target in the video based on the target detection result, and at the same time converts the coordinates of the pedestrian in the image coordinate system into a 2D trajectory in the world coordinate system. The server pushes the video image with a box and the 2D trajectory to the terminal in real time for display.

Figure 10:
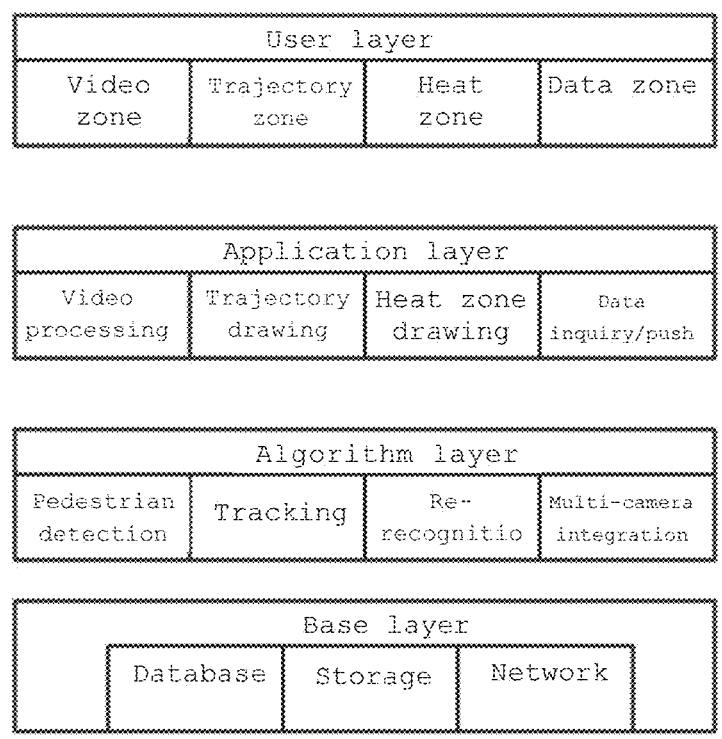
FIG. 10 shows a schematic view of a target tracking system according to another embodiment of the present disclosure.

FIG. 10 shows a schematic view of a target tracking system according to another embodiment of the present disclosure.

As shown in FIG. 10, in the functional level, the target tracking system comprises a base layer, an algorithm layer, an application layer, and a user layer. The basic layer comprises functions such as database, file storage and local area network. The algorithm layer comprises functions such as pedestrian detection, tracking, re-recognition, and multi-camera trajectory integration. The application layer comprises functions such as video processing, trajectory drawing, and hot zone drawing (that is, assessing a distribution condition of the passenger traffic over a period of time, and determining the shade of the color on the monitoring map based on the statistical results of the distribution of the passenger traffic, for example there is a darker color where there is a greater passenger traffic), and data inquiry and processing. The user layer comprises functions such as video display, trajectory display, hot zone display, and data display.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the present disclosure is defined by the appended claims.

What is claimed is:

1. A target tracking method, comprising:
determining an area where a current target is located, by performing target detection on a current frame image;
extracting a current position information of the area where the current target is located;
predicting a position information of an area where each historical target is located at a moment of the current frame image, based on historical position information of an area where each historical target is located on one or more historical frame images;
determining a historical target that is the same target as the current target, based on a position difference between the current position information and the predicted position information, and tracking the current target;
extracting a current feature vector of the area where the current target is located on the current frame image;
obtaining a historical feature vector of the area where each historical target is located on one or more historical frame images; and
determining a feature difference between the current target and the each historical target, based on the current feature vector and each historical feature vector;
wherein the determining a historical target that is the same target as the current target comprises:
determining the historical target that is the same target as the current target, based on the feature difference and the position difference.

2. The target tracking method according to claim 1, wherein the predicting a position information of an area where each historical target is located at a corresponding moment of the current frame image comprises:
predicting the position information of the area where each historical target is located at the corresponding moment of the current frame image, by a non-linear filtering method.

3. The target tracking method according to claim 2, wherein the predicting the position information of an area where each historical target is located at the corresponding moment of the current frame image comprises:
predicting the position information of the area where each historical target is located at the corresponding moment of the current frame image, with center point coordinates, aspect ratio and height of the area where each historical target is located on one or more historical frame images, as well as a rate of change in the center point coordinates, a rate of change in the aspect ratio and a rate of change in the height as inputs of the non-linear filtering method.

4. The target tracking method according to claim 1, wherein the determining a feature difference between the current target and the each historical target comprises:
determining the feature difference, based on a minimum cosine distance between the current feature vector and the each historical feature vector.

5. The target tracking method according to claim 1, wherein the position difference is determined based on a Mahalanobis distance between the current position information and the predicted position information.

6. The target tracking method according to claim 1, wherein the tracking the current target comprises:
updating a historical trajectory where the historical target is located, based on the current position information, and forming a tracking trajectory of the current target.

7. The target tracking method according to claim 6, wherein the forming a tracking trajectory of the current target comprises:
converting coordinates of each trajectory point in the historical trajectory updated in an image coordinate system into coordinates in a world coordinate system, and determining the tracking trajectory.

8. A target tracking device, comprising:
a memory; and
a processor coupled to the memory, wherein the processor is configured to perform the target tracking method according to claim 1 based on instructions stored in the memory device.

9. A non-transitory computer-readable storage medium on which a computer program is stored, which when executed by a processor implements the target tracking method according to claim 1.

10. A target tracking device, comprising one or more processors configured to:
determine an area where a current target is located, by performing target detection on a current frame image;
extract a current position information of the area where the current target is located;
predict a position information of an area where each historical target is located at a moment of the current frame image, based on historical position information of an area where each historical target is located on one or more historical frame images;

determine a historical target that is the same target as the current target, based on a position difference between the current position information and the predicted position information, and tracking the current target;

extract a current feature vector of the area where the current target is located on the current frame image;

obtain a historical feature vector of the area where each historical target is located on one or more historical frame images; and determine a feature difference between the current target and the each historical target, based on the current feature vector and each historical feature vector;

wherein the determining a historical target that is the same target as the current target comprises:

determine the historical target that is the same target as the current target, based on the feature difference and the position difference.

11. The target tracking device according to claim 10, wherein the predicting a position information of an area where each historical target is located at a corresponding moment of the current frame image comprises:

predicting the position information of the area where each historical target is located at the corresponding moment of the current frame image, by a non-linear filtering method.

12. The target tracking device according to claim 11, wherein the predicting the position information of an area where each historical target is located at the corresponding moment of the current frame image comprises:

predicting the position information of the area where each historical target is located at the corresponding moment of the current frame image, with center point coordinates, aspect ratio and height of the area where each historical target is located on one or more historical frame images, as well as a rate of change in the center point coordinates, a rate of change in the aspect ratio and a rate of change in the height as inputs of the non-linear filtering method.

13. The target tracking method according to claim 10, wherein the tracking the current target comprises:

updating a historical trajectory where the historical target is located, based on the current position information, and forming a tracking trajectory of the current target.

14. The target tracking method according to claim 13, wherein the forming a tracking trajectory of the current target comprises:

converting coordinates of each trajectory point in the historical trajectory updated in an image coordinate system into coordinates in a world coordinate system, and determining the tracking trajectory.

15. A target tracking system, comprising:

the target tracking device according to claim 10.

16. The target tracking system according to claim 15, further comprising:

one or more image sensors for obtaining a frame image containing a target.

17. The target tracking system according to claim 15, further comprising:

a display device for displaying a tracking trajectory under a world coordinate system.

* * * * *